United States Patent
Zhang et al.

(10) Patent No.: US 9,692,991 B2
(45) Date of Patent: Jun. 27, 2017

(54) MULTISPECTRAL IMAGING SYSTEM

(71) Applicant: QUALCOMM Incorporated, San Diego, CA (US)

(72) Inventors: Xiaopeng Zhang, Richmond Hill (CA); Gang Qiu, Markham (CA); Jilai Wang, Richmond Hill (CA); Xiaoming Zhou, Markham (CA); Liang Shen, Toronto (CA); Milivoje Aleksic, San Diego, CA (US); Sundeep Vaddadi, San Diego, CA (US); Shaojie Zhuo, Markham (CA)

(73) Assignee: QUALCOMM Incorporated, San Diego, CA (US)

(*) Notice: Subject to any disclaimer, the term of this patent is extended or adjusted under 35 U.S.C. 154(b) by 641 days.

(21) Appl. No.: 13/663,897

(22) Filed: Oct. 30, 2012

(65) Prior Publication Data

US 2013/0250123 A1 Sep. 26, 2013

Related U.S. Application Data

(60) Provisional application No. 61/555,910, filed on Nov. 4, 2011.

(51) Int. Cl.
*H04N 5/33* (2006.01)
*G06T 7/33* (2017.01)

(52) U.S. Cl.
CPC ............. *H04N 5/332* (2013.01); *G06T 7/33* (2017.01); *G06T 2207/10048* (2013.01)

(58) Field of Classification Search
CPC .................................. G01J 3/36; G01J 5/0022
See application file for complete search history.

(56) References Cited

U.S. PATENT DOCUMENTS

| | | | | |
|---|---|---|---|---|
| 5,001,558 A | * | 3/1991 | Burley et al. | 348/164 |
| 5,555,324 A | * | 9/1996 | Waxman et al. | 382/254 |
| 6,606,406 B1 | * | 8/2003 | Zhang et al. | 382/154 |
| 6,646,799 B1 | * | 11/2003 | Korniski et al. | 359/407 |
| 7,345,277 B2 | * | 3/2008 | Zhang | 250/330 |
| 7,570,286 B2 | | 8/2009 | Koike et al. | |
| 7,809,258 B2 | * | 10/2010 | Strandemar et al. | 396/80 |

(Continued)

FOREIGN PATENT DOCUMENTS

| CN | 101833767 A | 9/2010 |
|---|---|---|
| CN | 102012939 A | 4/2011 |

(Continued)

OTHER PUBLICATIONS

International Search Report and Written Opinion—PCT/US2012/062799—ISA/EPO—Feb. 19, 2013.

(Continued)

*Primary Examiner* — Francis G Geroleo
(74) *Attorney, Agent, or Firm* — Knobbe, Martens, Olson & Bear, LLP

(57) ABSTRACT

Systems and methods for multispectral imaging are disclosed. The multispectral imaging system can include a near infrared (NIR) imaging sensor and a visible imaging sensor. The disclosed systems and methods can be implemented to improve alignment between the NIR and visible images. Once the NIR and visible images are aligned, various types of multispectral processing techniques can be performed on the aligned images.

24 Claims, 11 Drawing Sheets

(56) References Cited

U.S. PATENT DOCUMENTS

| | | | |
|---|---|---|---|
| 7,982,634 B2 | 7/2011 | Arrighetti | |
| 8,531,562 B2* | 9/2013 | Schmidt et al. | 348/262 |
| 2005/0100207 A1* | 5/2005 | Konolige | 382/154 |
| 2005/0286756 A1 | 12/2005 | Hong et al. | |
| 2006/0257024 A1 | 11/2006 | Hahn et al. | |
| 2007/0247517 A1 | 10/2007 | Zhang et al. | |
| 2007/0279514 A1* | 12/2007 | Mitsumine et al. | 348/336 |
| 2009/0003687 A1 | 1/2009 | Agarwal et al. | |
| 2009/0279790 A1 | 11/2009 | Burge et al. | |
| 2010/0182406 A1* | 7/2010 | Benitez | 348/46 |
| 2010/0289885 A1* | 11/2010 | Lu et al. | 348/61 |
| 2010/0290703 A1 | 11/2010 | Sim et al. | |
| 2010/0303340 A1* | 12/2010 | Abraham et al. | 382/154 |
| 2011/0080466 A1* | 4/2011 | Kask et al. | 348/43 |

FOREIGN PATENT DOCUMENTS

| | | |
|---|---|---|
| CN | 102231191 A | 11/2011 |
| EP | 2549762 A1 | 1/2013 |
| JP | H0927969 A | 1/1997 |
| JP | 2006146810 A | 6/2006 |
| JP | 2007053621 A | 3/2007 |
| JP | 2007515853 A | 6/2007 |
| JP | 2008511080 A | 4/2008 |
| KR | 100551825 B1 | 2/2006 |
| KR | 20080092353 A | 10/2008 |
| KR | 101051716 B1 | 7/2011 |
| WO | WO-2005038743 A1 | 4/2005 |
| WO | WO-2006036398 A2 | 4/2006 |
| WO | WO-2011114683 A1 | 9/2011 |

OTHER PUBLICATIONS

Radhika, V. N. et al., "Robust Stereo Image Matching for Spaceborne Imagery", IEEE Transactions on Geoscience and Remote Sensing, Sep. 1, 2007, IEEE Service Center, Piscataway, NJ, US, vol. 45, No. 9, pp. 2993-3000, XP011191009, ISSN: 0196-2892, DOI: 10.1109/TGRS.2007.898238.

Tola, E. et al., "A fast local descriptor for dense matching", IEEE Conference on Computer Vision and Pattern Recognition (CVPR), Jun. 23, 2008, IEEE, Piscataway, NJ, USA, pp. 1-8, XP031297231, ISBN: 978-1-4244-2242-5.

Anonymous: "Technology Trends", (establishes publication date of Krishnaswamy, "Indian Remote Sensing Satellite Cartosat-1: Tecnhical features and data products" in 2002 on the "Map Asia 2002" conference), Proc. Map Asia 2002, Jan. 1, 2002 (Jan. 1, 2002), pp. 1-1, XP055080886, Retrieved from the Internet: URL: http://www.gisdevelopment.net/proceedings/mapasia/2002/tt/index.htm.

Krishnaswamy M., et al., "Indian Remote Sensing Satellite Cartosat-1: Technical features and data products", Proc. Map Asia 2002, Jan. 1, 2002 (Jan. 1, 2002), pp. 1-2, XP055080872.

Fredembach et al., "Combining visible and near-infrared images for realistic skin smoothing". In Proc. IS&T/SID 17th Color Imaging Conference, (CIC), 2009, pp. 1-6.

Liu, et al:, "SIFT Flow: Dense Correspondence across Different Scenes," 10th European Conference on Computer Vision, Marseille, FR, 2008, in 15 pages.

Lowe, "Distinctive Image Features from Scale-Invariant Keypoints," International Journal of Computer Vision, Jan. 5, 2004, 28 pp.

Ben-Ezra, et al., Motion-Based Motion Deblurring: IEEE Transactions on Pattern Analysis and Machine Intelligence, vol. 26 No. 6 (Jun. 2004) pp. 689-698.

Schaul L., et al., "Color Image Dehazing using the Near-Infrared", International Conference on Image Processing, Cairo, Egypt, 2009, in 4 pages.

Zhang X., et al., "Enhancing Photographs with Near Infrared Images", IEEE Computer Society Conference on Computer Vision and Pattern Recognition, Anchorage, US, 2008, in 8 pages.

Zhuo S., et al., "Enhancing Low Light Images Using Near Infrared Flash Images", International Conference on Image Processing, Hong Kong, 2010, in 4 pages.

Zhuo S., et al., "Recovering Depth from a Single Defocused Image", Pattern Recognition, vol. 44 (9), pp. 1852-1858, 2011.

Chen Z., et al., "Quasi-dense Matching for Wide Baseline images of Building Scene," Journal of Frontiers of Computer Science and Technology, 2000, vol. 4, No. 12, pp. 1089-1100.

Zhai Y.-G., et al., "An Automatic and High-precision Registration Method Based on Point Features for Multi-source Remote Sensing Images," Remote Sensing Technology and Application, Jun. 2010, vol. 25, No. 3, pp. 404-409.

\* cited by examiner

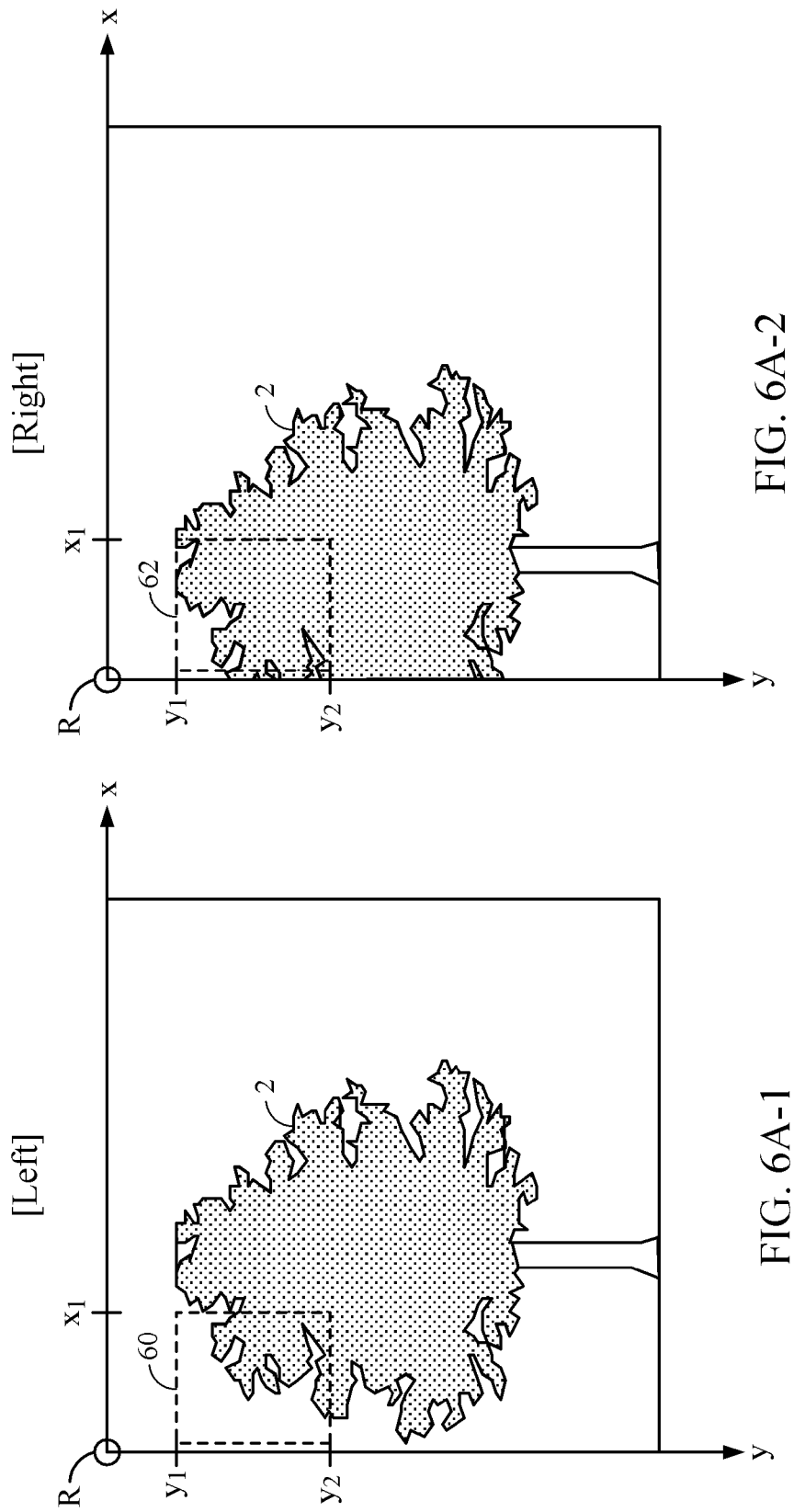

MULTISPECTRAL IMAGING SYSTEM

CROSS-REFERENCE TO RELATED APPLICATIONS

The present application claims the benefit under 35 U.S.C. §119(e) of U.S. Provisional Patent Application No. 61/555,910, filed on Nov. 4, 2011, entitled "HYBRID MULTISPECTRAL IMAGING SOLUTION ON A MOBILE PLATFORM," the entire contents of which is hereby incorporated by reference herein in its entirety and for all purposes.

BACKGROUND OF THE INVENTION

Field of the Invention

The present disclosure relates to systems and methods for multispectral imaging. In particular, the disclosure relates to systems and methods for aligning a near infrared (NIR) image with a visible image.

Description of the Related Art

Mobile devices, such as smartphones or tablet computing devices, are increasingly designed to include a multitude of device and software modules to provide the user with a wide range of applications. For example, cameras are becoming an important feature on mobile devices, and there is an increasing demand to improve both the image quality and the functionality of cameras installed on mobile devices. For example, it is desirable for cameras to be able to capture richer image information, either for quality enhancement purposes or for new features that are being developed, such as stereoscopic imaging applications.

Conventionally, cameras on mobile devices are used to capture still images or videos using a visible imaging sensor. In order to achieve improved color quality and higher signal-to-noise ratio (SNR), imaging sensors are normally designed to capture the visible light spectrum only. As technology has progressed, some portable electronic devices can also capture stereoscopic images. Device manufacturers have responded by introducing devices integrating digital image processing to support this capability, utilizing single or multiple digital imaging sensors. A wide range of electronic devices, including mobile wireless communication devices, tablet computing devices, personal digital assistants (PDAs), personal music systems, digital cameras, digital recording devices, video conferencing systems, and the like, make use of stereoscopic imaging capabilities to provide a variety of capabilities and features to their users. These include stereoscopic (3D) imaging applications such as 3D photographs and videos.

SUMMARY

In one implementation, an electronic method for aligning a near infrared (NIR) image with a visible image in a system including a NIR imaging sensor and a visible imaging sensor is disclosed. The method can comprise receiving a NIR image from the NIR imaging sensor, and receiving a visible image from the visible imaging sensor. The method can further include matching pixels in the NIR image with pixels in the visible image to form a plurality of matched pixel pairs. Further, the method can include calculating pixel disparities for each matched pixel pair. The method can also assign weights to each matched pixel pair based at least in part on the calculated pixel disparities for each matched pixel pair. The method can align the NIR image with the visible image based at least in part on the assigned weights.

In another implementation, a multispectral imaging system is disclosed. The imaging system can include a near infrared (NIR) imaging sensor configured to capture a NIR image, and a visible light imaging sensor configured to capture a visible light image. In addition, the system can include a dense matching module programmed to match pixels in the NIR image with pixels in the visible light image to form a plurality of matched pixel pairs. The system can also include a sparse matching module programmed to calculate pixel disparities for each matched pixel pair. The sparse matching module can also be programmed to assign weights to each matched pixel pair based at least in part on the calculated pixel disparities for each matched pixel pair. An aligned image formation module can be programmed to align the NIR image with the visible image based at least in part on the assigned weights. A storage module can be programmed to store the aligned image on the system.

In another implementation, an imaging system is disclosed. The imaging system can include means for receiving a NIR image from a NIR imaging sensor, and means for receiving a visible image from a visible imaging sensor. The system can also include means for matching pixels in the NIR image with pixels in the visible image to form a plurality of matched pixel pairs. Further, the system may include means for calculating pixel disparities for each matched pixel pair. The system can also include means for assigning weights to each matched pixel pair based at least in part on the calculated pixel disparities for each matched pixel pair. The system can also include means for aligning the NIR image with the visible image based at least in part on the assigned weights.

In yet another implementation, a non-transitory computer-readable medium is disclosed. The non-transitory computer-readable medium may have stored thereon code that when executed performs a computer-implemented method. The computer-implemented method can include receiving a NIR image from the NIR imaging sensor, and receiving a visible image from the visible imaging sensor. The code stored on the non-transitory computer-readable medium may, when executed, perform the method that further includes matching pixels in the NIR image with pixels in the visible image to form a plurality of matched pixel pairs. The computer-implemented method may also include calculating pixel disparities for each matched pixel pair. Further, the code stored on the non-transitory computer-readable medium may, when executed, perform the method that further includes assigning weights to each matched pixel pair based at least in part on the calculated pixel disparities for each matched pixel pair. The computer-implemented method may also include aligning the NIR image with the visible image based at least in part on the assigned weights.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Specific implementations of the invention will now be described with reference to the following drawings, which are provided by way of example, and not limitation.

FIGS. 6A-1, 6A-2, 6B-1, and 6B-2 are schematic diagrams showing two images captured by the multispectral imaging system of FIG. 2.

DETAILED DESCRIPTION

Figure 1:
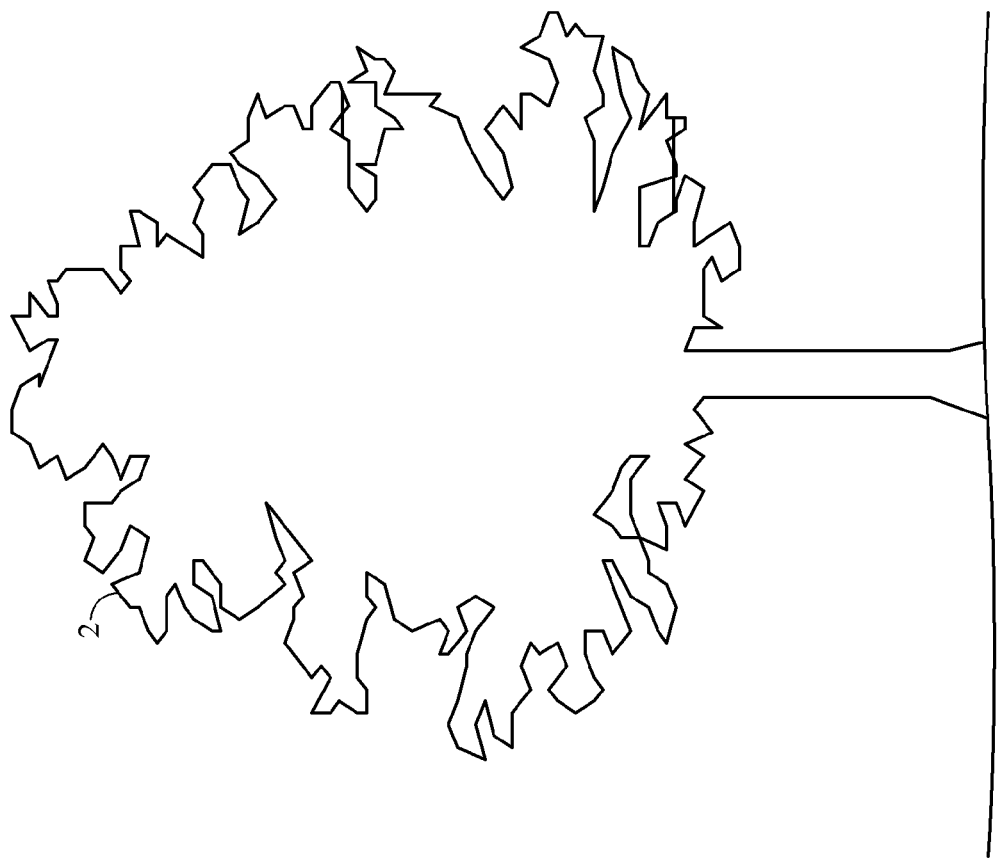
FIG. 1 is a perspective view of one embodiment of a mobile device having a multispectral imaging system that is configured to capture multispectral image data of a scene of interest.
Figure 1:

Implementations disclosed herein provide systems, methods and apparatus for taking images using two different types of imaging sensors, for example a NIR sensor and a visible light sensor. This type of multispectral imaging can be useful for creating images having, for example, better contrast than an image captured with only a visible light sensor. In one embodiment, the light received at the visible light sensor can carry rich details of a scene, while the light captured by the NIR sensor can be used to enhance the contrast of the image or perform image de-hazing. For example, the NIR images and visible images may be decomposed into average and detail wavelet subbands. The brightness and texture details may be transferred from the NIR image to the visible image using a histogram-matching technique to improve the quality of the captured visible light image.

Another embodiment is a system that uses a NIR sensor and a visible light sensor to enhance an image. In this embodiment, the contrast and texture data from the NIR image is transferred to the visible image using the weighted region mask, and a wavelet transform is performed. A histogram-matching technique can then be used to calculate the contrast data using the low frequency subbands of the visible and NIR images. The high frequency subbands of both the visible and NIR images are used to compute the texture data. Of course, as a skilled artisan would recognize, these contrast and texture enhancement methods are only a few ways of enhancing contrast in multispectral imaging systems. Other suitable methods may be used with the disclosed imaging system.

In another embodiment, a NIR sensor is used to enhance images captured in low light conditions. For example, in conventional low light systems, a visible flash system is often used to illuminate the object to be imaged. However, such artificial light may ruin the ambience of the image and may introduce unwanted artifacts like red eye, undesired reflections, and shadows. In this method, a NIR flash lamp is used instead of a visible flash, and a conventional visible imaging sensor (such as a RGB color CCD) captures the image. The NIR flash image is not contaminated with noise as in the visible flash, and the NIR flash image may be used in conjunction with a denoising technique (such as a weighted least squares smoothing technique) to remove noise from the visible (e.g., RGB) image caused by low lighting conditions. Of course, as a skilled artisan would recognize, this noise reduction method is only one way of reducing noise in imaging systems. Other suitable methods may be used with the disclosed imaging system.

In yet other embodiments, the disclosed hybrid imaging system may be used in skin smoothing applications. In portrait photography, certain undesirable skin features, such as wrinkles, freckles, and spots, may be captured in an image. The disclosed multispectral imaging system may be used to remove or smooth these undesirable features in many different ways.

In various implementations, systems and methods for aligning NIR images with visible images are disclosed. For example, as explained herein, multispectral imaging systems can take advantage of the image data captured at the wavelengths of the respective imaging sensors. In NIR-visible multispectral imaging systems, the NIR image data and the visible image data can be used to, e.g., enhance image quality and to enable hybrid and/or stereoscopic imaging applications. To take advantage of the benefits of NIR-visible multispectral imaging applications, it can be important to ensure that the NIR image data is aligned with the visible image data before image processing is conducted.

Various implementations disclosed herein provide systems and methods that improve the alignment of NIR and visible images. For example, in one implementation, a NIR sensor and a visible light sensor are positioned side-by-side and vertically aligned in a pre-calibration procedure. Input images are captured by the NIR sensor and the visible light sensor. The multispectral imaging system can perform an initial dense matching procedure to match the NIR image and the visible image on essentially a pixel-by-pixel basis. The system can also perform a subsequent sparse matching procedure to detect matches in larger blocks of pixels and can establish a homographic constraint between the perspectives of the NIR image and the visible image. The system can propagate the sparse matching results to the dense matching results to obtain aligned images. One skilled in the art will recognize that the disclosed embodiments may be implemented in hardware, software, firmware, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination may correspond to a return of the function to the calling function or the main function, or a similar completion of a subroutine or like functionality.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

FIG. 1 is a 3D perspective view of a multispectral imaging system 10 that is configured to capture multispectral image data of a scene. As shown in FIG. 1, the multispectral imaging system 10 may be operated by a user to capture multispectral image data of the scene that includes a tree 2. The multispectral imaging system 10 includes a visible light sensor 5 and a NIR sensor 7 that are configured to capture visible light and NIR light, respectively. In various implementations, for example, the visible light sensor 5 is an imaging sensor configured as a RGB sensor that senses red, green, and blue visible light.

Advantageously, the multispectral imaging system 10 can be integrated with a mobile device (e.g., a mobile phone or other mobile computing device) such that the imaging system 10 can be easily manipulated by the user. Because the multispectral imaging system 10 can capture light from both the visible and the NIR spectra, the user may be able to view rich details of the tree 2 that is imaged. Further, if the imaging sensors are configured to capture both still and video images, then the user can view video image data that is substantially de-blurred, as explained herein. Moreover, because two sensors are used, the multispectral image data captured by the visible light sensor 5 and the NIR sensor 7 can be used to render a three-dimensional (3D) perspective of the tree 2 by employing various stereoscopic imaging procedures. Skilled artisans will appreciate that still other applications may be possible with the multispectral imaging system 10 disclosed in FIG. 1.

Figure 2:
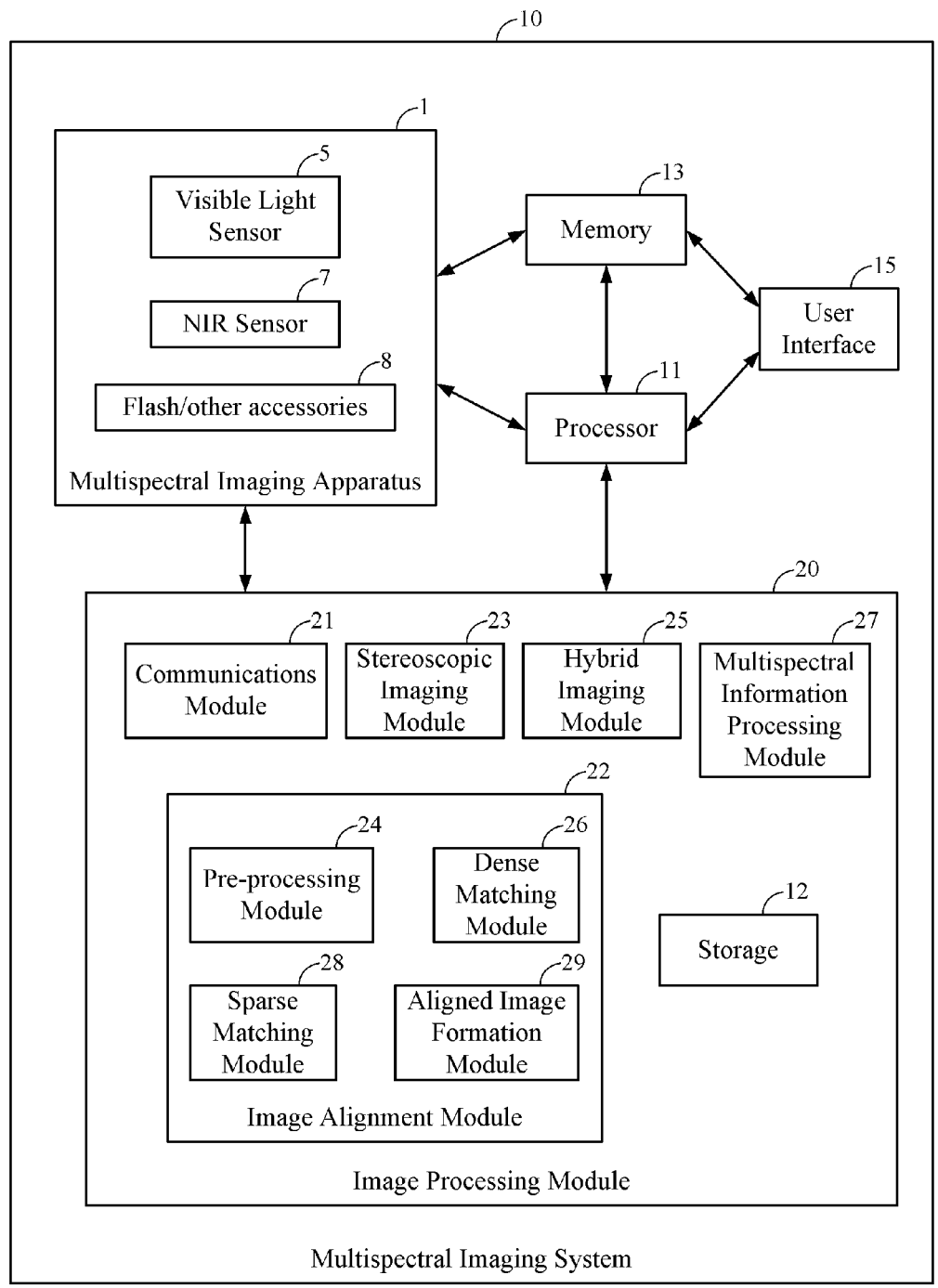
FIG. 2 is a schematic block diagram of a multispectral imaging system, according to one implementation.

FIG. 2 is a schematic block diagram of a multispectral imaging system 10. The multispectral imaging system 10 can include a multispectral imaging apparatus 1. The multispectral imaging apparatus 1 can be configured to include one or more multispectral imaging sensors that can sense a broad band of wavelengths, including at least visible light wavelengths and near infrared (NIR) light wavelengths. For example, the multispectral imaging apparatus 1 can be configured to detect light at wavelengths between about 390 nm and about 1400 nm. Of course, the imaging apparatus 1 can also be configured to detect a much broader range of wavelengths as well. In some implementations, a charge-coupled device (CCD) can be used as the multispectral imaging sensor(s). In other implementations, a CMOS imaging sensor can be used as the multispectral imaging sensor(s). In addition, a flash module 8 and/or other accessories may be included in the multispectral imaging apparatus 1 to help illuminate the scene. In various implementations, the flash module 8 can include visible and/or NIR flash devices.

In the implementation shown in FIG. 2, the multispectral imaging apparatus 1 includes two separate sensors instead of a single multispectral imaging sensor. In this implementation, the multispectral imaging apparatus 1 includes a visible light sensor 5 and a separate NIR sensor 7. For example, the multispectral imaging apparatus 1 has a first, visible sensor 5 such as a CCD/CMOS sensor capable of detecting visible light at least in the range between about 390 nm and about 800 nm. The multispectral imaging apparatus 1 further includes a second, NIR sensor 7, such as a CCD/CMOS sensor that is capable of detecting NIR light in the range between about 800 nm and about 1400 nm. In some implementations, the wavelength ranges for the visible and NIR sensors can overlap or can even be substantially the same. In some implementations, imaging filters, such as a NIR pass filter, can be used on a suitable CCD/CMOS sensor to detect only the NIR data. In one implementation, for example, both the visible light sensor 5 and the NIR sensor 7 can be implemented on a Samsung® S5K4E1GX QSXGA CMOS sensor. The NIR sensor 7 can be implemented by removing an IR-cutoff filter to enable the sensor to receive NIR light. The modified, NIR sensor 7 can be further covered by an IR filter to filter out lower wavelengths, e.g., wavelengths less than about 800 nm. For example, a Kodak® Wratten IR filter (#87C) can be applied over the NIR sensor 7. Skilled artisans would understand that other types of sensors are possible. Skilled artisans would understand that various other sensors or combinations thereof can be used to capture visible and NIR image data.

The multispectral imaging system 10 further includes a processor 11 and a memory 13 that are in data communication with each other and with the imaging apparatus 1. The processor 11 and memory 13 can be used to process and store the images captured by the imaging apparatus 1. In addition, the multispectral imaging system 10 can include a user interface (UI) (not shown) configured to provide input/output (I/O) operations to the user. For example, the UI can include a display that presents various icons to the user. The UI may also include various input devices, such as a keyboard, touch-screen input, mouse, rollerball, data inputs (e.g., USB or wireless), and/or any other suitable type of input device. The UI can be programmed to allow the user to manipulate image data and/or to select the imaging mode that the user desires to use. The UI may also include controls for capturing the multispectral image data.

Further, the processor 11 and memory 13 can be configured to implement processes stored as software modules in an image processing module 20 and configured to process multispectral image data captured by the multispectral imaging apparatus 1. The image processing module 20 can be implemented in any suitable computer-readable storage medium, such as a non-transitory storage medium. The image processing module 20 can have any number of software modules. For example, a communications module 21 can be implemented on the image processing module 20. The communications module 21 can comprise computer-implemented instructions that manage the flow of data between the components of the multispectral imaging system 10. For example, the communications module 21 can include instructions that manage the receipt of image data from the multispectral imaging apparatus 1. The image processing module 20 also includes a storage module 12 configured to store various types of data, source code, and/or executable files. For example, the storage module 12 can be programmed to store image data received by the imaging apparatus 1 and/or image data processed by the image processing module 20.

The image processing module 20 can also include various modules that are programmed to implement various multispectral imaging applications. For example, the image processing module 20 includes a stereoscopic imaging module 23 that is programmed to render a three-dimensional (3D) image based on a depth map computed from the NIR image and the visible image. As explained herein, the visible light sensor 5 and the NIR sensor 7 can be spaced apart by a known distance. The stereoscopic imaging module 23 can utilize the known separation between the visible light sensor 5 and the NIR sensor 7 to produce 3D visualization effects to the user.

In addition, the image processing module 20 includes a hybrid imaging module 25. The hybrid imaging module 25 can be programmed to process both still images and video images captured by the imaging apparatus 1. For example, the hybrid imaging module 25 can be programmed to process still image data from the visible light sensor 5 and video image data from the NIR sensor 7, or vice versa. The still image data and the video image data can be simultaneously captured by the respective sensors in some arrangements; in other arrangements, the still and video image data can be captured at separate times. In various implementations, the still image data can be captured at a higher resolution than the video image data in order to reduce motion blur in images of a scene.

The image processing module 20 also includes a multispectral information processing module 27. The multispectral information processing module 27 can be programmed to process NIR image data captured from the NIR sensor 7 to enhance contrast in visible image data captured from the visible light sensor 5. In various implementations, the multispectral information processing module 27 can be programmed to de-haze images and/or to improve texture information in images. The multispectral information processing module 27 can be further programmed to reduce noise in visible images using a NIR flash device 8. In yet other implementations, the multispectral information processing module 27 can be programmed to smooth skin imperfections in captured images.

As mentioned above, in one embodiment, the NIR and visible images are aligned before the images are processed for any of the various multispectral imaging applications. Thus, the image processing module 20 can also include an image alignment module 22. The image alignment module 22 can include a pre-processing module 24 programmed to perform any preliminary operations on the NIR and visible images, such as, e.g., confirming that the visible light sensor 5 and the NIR sensor 7 are aligned vertically. The image alignment module 22 can further include a dense matching module 26 programmed to match pixels in the NIR image with pixels in the visible image to form a plurality of matched pixel pairs. The dense matching module 26 can thereby provide an initial, pixel-by-pixel alignment of the NIR and visible images based on image descriptors for each image. As explained herein, the image descriptors may be based in part on image gradients measured in the respective images.

The image alignment module 22 also includes a sparse matching module 28 programmed to generally align sparse portions of the NIR and visible images. For example, as explained herein, the sparse matching module 28 can be programmed to calculate pixel disparities for each matched pixel pair. In various implementations, the pixel disparities can be based on a pixel separation distance for each matched pixel pair. The sparse matching module 28 can be programmed to assign weights to each matched pixel pair based at least in part on the calculated pixel disparities for each matched pixel pair. Once the weights are assigned, in various implementations, the matches with the higher weights are kept, while the matches with the lower weights are discarded. A piece-wise homographic constraint between the visible and NIR images can be estimated, and the matches that satisfy the homographic constraint can be kept for subsequent alignment processing.

Moreover, the image alignment module 22 can include an aligned image formation module 29 programmed to align the NIR image with the visible image based at least in part on the assigned weights. For example, the image alignment module 22 can propagate the sparse matching results to the dense matching results based on an intensity similarity value and/or a confidence map, e.g., such as the weights that were assigned by the sparse matching module 28. In some aspects, the NIR image can be warped to the perspective of the visible image, or vice versa, to confirm that the alignment of the images is accurate.

Process Overview

Figure 3:
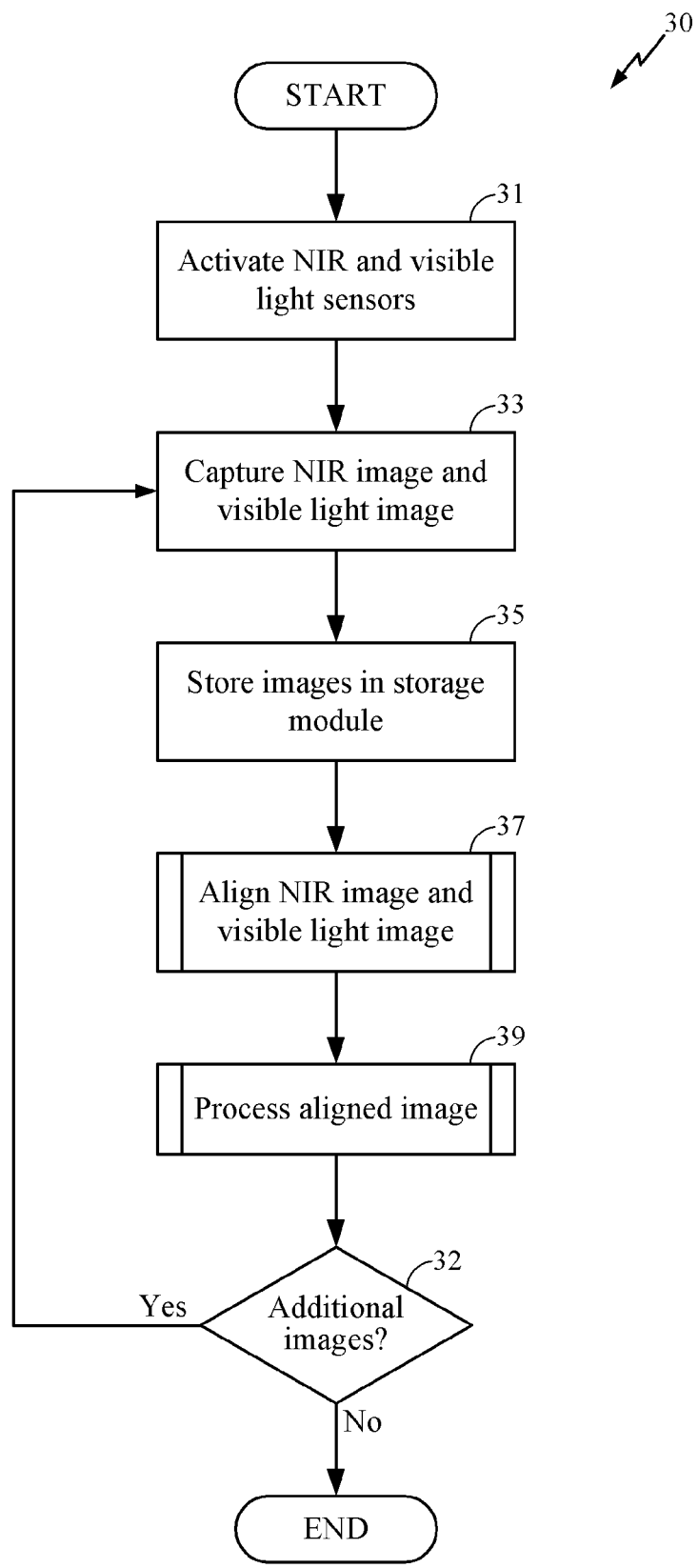
FIG. 3 is a flowchart of a method for capturing multispectral image data of a particular scene, according to one implementation.

FIG. 3 is a flowchart of a method 30 for capturing multispectral image data of a particular scene, according to one implementation. The illustrated method 30 begins in a block 31 wherein the NIR and visible light sensors are activated. For example, with reference to FIGS. 1 and 2, the user may power up and/or boot-up the imaging system 10 to enable the sensors to capture the scene. In various implementations, an icon on a mobile device may be engaged to activate the NIR and visible light sensors 5 and 7. The method then moves to a block 33, wherein a visible light image is captured by the visible light sensor and a NIR image is captured by the NIR sensor. In various arrangements, a flash (e.g., visible and/or NIR flash) may be used to illuminate the scene. After capturing the visible light and NIR images of the scene, the process 30 moves to a block 35, wherein the captured images are stored to a storage module, such as the storage module 12.

Once the images are stored in block 35, the NIR image and the visible image can be aligned by the process 30 in a process block 37. By accurately aligning the images, image artifacts caused by misalignment can be reduced or eliminated. The process 30 then moves to a process block 39 to process the aligned image. Depending on the multispectral imaging application and/or the preferences of the user, various types of multispectral imaging procedures may be performed in processing block 39. For example, the stereoscopic imaging module 23 can execute procedures to render 3D perspectives to the user. In other aspects, the hybrid imaging module 25 can execute computer-implemented instructions to process both still image and video image data. Further, the multispectral information processing module 27 can enhance the image quality of the visible and/or NIR images. Skilled artisans will understand that various other multispectral image processing techniques can be performed in block 39.

The process 30 then moves to a decision block 32, to determine whether additional images are to be processed. If a decision is made in decision block 32 that additional images are to be processed, then the method 30 returns to block 33 to capture additional NIR image data and visible light image data. If a decision is made in decision block 32 that no additional images are to be processed, then the method 30 terminates.

Image Alignment Overview

Figure 4:
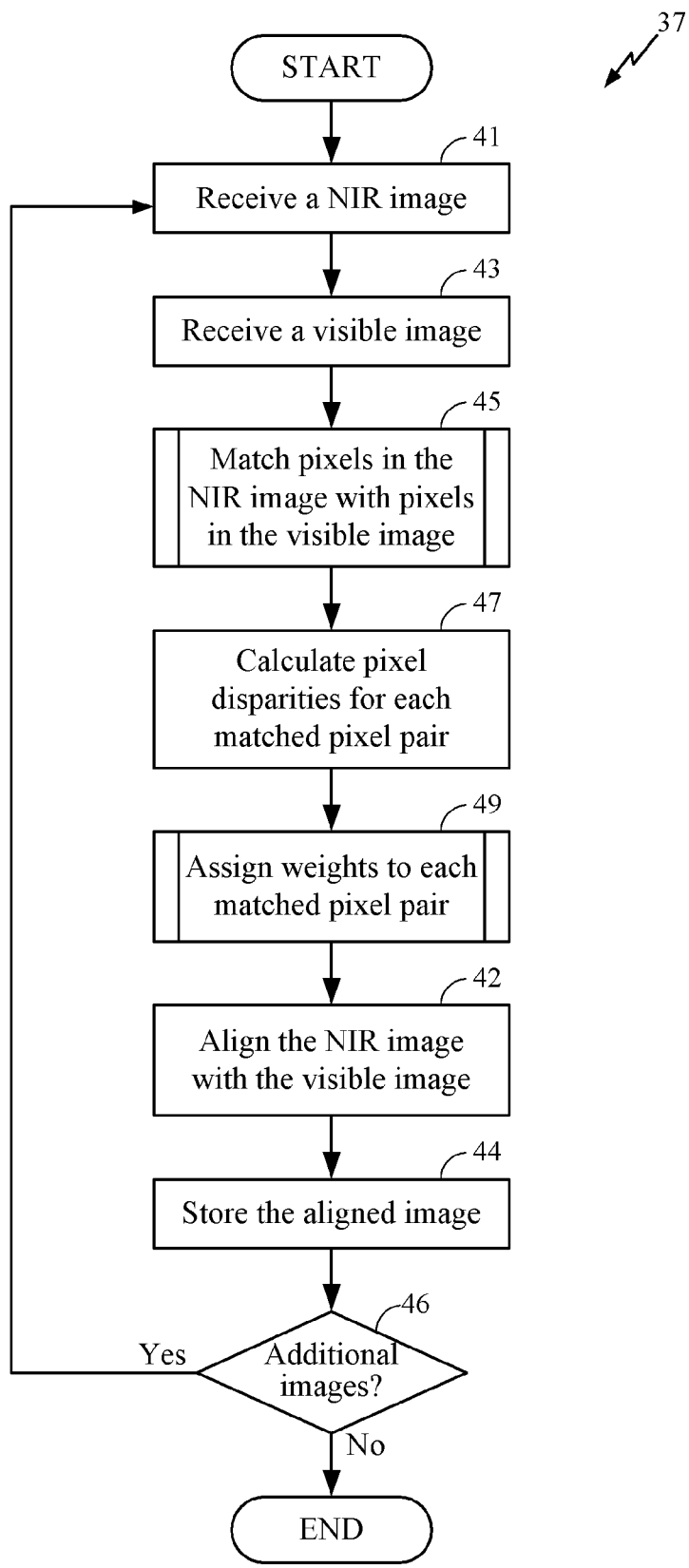
FIG. 4 is a flowchart of a method for aligning a NIR image and a visible light image, according to the implementation of FIG. 3.

FIG. 4 is a flowchart of the method shown in process block 37 for aligning a NIR image and a visible light image, according to the implementation of FIG. 3. The method 37 begins in a block 41 wherein a NIR image is received. For example, the image alignment module 20 of FIG. 2 can receive the NIR image from the multispectral imaging apparatus 1. The method 37 can proceed to a block 43 to receive a visible image. As explained herein, the image alignment module 20 can receive the visible image from the multispectral imaging apparatus 1 (FIG. 2).

The method 37 then moves to a process block 45 to match pixels in the NIR image with pixels in the visible image. As explained with respect to FIG. 2 above, the dense matching module 26 can form a plurality of matched pixel pairs to provide an initial, pixel-by-pixel alignment of the NIR and visible images. As will be explained below with respect to FIGS. 5 and 6A-6B, the matched pixel pairs in the NIR and visible images can be formed by calculating image descriptors based on image gradients in the respective images. For each pixel in one of the images (e.g., the NIR or the visible image), the image alignment module 22 can search for the nearest neighbor of that pixel in the other image. For example, for a particular pixel in, say, the NIR image, the image descriptor for that particular pixel, or for a region including that particular pixel, can be calculated based on the image gradient at or near the pixel.

The image alignment module 22 can generate a set of candidate pixels in the other image, e.g., the visible image, which might be the nearest neighbor of that particular pixel in the NIR image. The image alignment module 22 can further calculate the Euclidean distance between the descriptor for the particular pixel in the NIR image and the descriptor for each pixel in the candidate set of pixels in the visible image. The pixel in the visible image that has the minimum Euclidean distance between image descriptors is then paired with the particular pixel in the NIR image to form a matched pixel pair. The matched pixel pairs determined in process block 45 may therefore represent pixels in each of the NIR and visible images that are associated with the same portion of the captured scene. Thus, if Pixels A and B are a matched pixel pair, then Pixel A of the NIR image may represent the same portion of the imaged scene or object that Pixel B represents in the corresponding visible image. Further details of the process taking place in the process block 45 are explained herein with respect to FIGS. 5 and 6A-6B. As explained herein, calculating the Euclidean distance between the image descriptors for pixel pairs is one way to calculate a matching cost associated with two pixels. However, it should be appreciated that there are other ways to calculate the matching costs between pixels in the NIR and visible images. Skilled artisans will appreciate that other methods for comparing two descriptor vectors may be suitable for various implementations.

The method 37 then moves to a block 47 to calculate pixel disparities for each matched pixel pair. Pixel disparities may refer to an offset in pixels in the image plane that display image data representative of a particular portion of an object in the scene. For example, a first pixel of a matched pixel pair, Pixel A, may be located in a first location in the NIR image, while the second pixel, Pixel B, of the matched pixel pair may be located in a second location in the visible image. Note that, although the NIR images and the visible images may be separate images, a common coordinate system may be assigned to both images such that the pixels in each image may be referenced or located with respect to a common frame of reference. Thus, if the first location of Pixel A in the NIR image is separated by some distance from the second location of Pixel B in the visible image, then Pixels A and B may be considered to have a pixel disparity, e.g., a distance separating the pixels in the image plane, as measured from a common frame of reference in the NIR and visible images. Further examples of pixel disparities are explained herein with respect to FIGS. 6A-6B.

The method 37 can then proceed to a process block 49 to assign weights to each matched pixel pair. As explained herein with respect to FIG. 7, the images and the matched pixel pairs can be divided or segmented into larger blocks, and each matched pixel pair can be assigned a weight that is based at least in part on the pixel disparities calculated in the block 47, and in part on color disparities between the pixels in each matched pair. As explained herein, the weight may also be based on a distance ratio that is calculated based on the Euclidean distance between the image descriptors for each matched pixel pair. Matches within the block that have a relatively high weight (e.g., the matched pairs having the top 50% of weights) may be used to estimate a homographic constraint that relates the geometry of the NIR and visible images. In general, a homographic constraint is a geometric transformation that can be used to relate the perspectives of two images. Matches that satisfy the homographic constraint for the NIR and visible images may be used to form the aligned NIR and visible images. Further details of the process of block 49 are explained herein with respect to FIG. 7.

In general, therefore, the method undertaken in process block 49 may be implemented to find pixels within the block that belong to the same surface or portion of an object being imaged. For example, the dense pixel matching process of process block 45 can be implemented to match pixels on a pixel-by-pixel basis. On the other hand, the sparse matching process of process block 49 (which may also include the steps of block 47) may be implemented to ensure that disparate portions of an image are generally aligned. Thus, even though pixels may be matched on a pixel-by-pixel basis in block 45, this does not necessarily mean that the matched pixels correspond to pixels associated with the same object in the scene for the entire image.

The process undertaken in process block 49 is performed to confirm that the pixels that were densely matched in process block 45 do indeed correspond to the same object(s) across the entire image, e.g., to ensure that the image is sparsely as well as densely aligned. Indeed, selecting high weights to compute the homographic constraint can ensure that there is a high confidence that the matched pairs within a particular block are accurately aligned. Moreover, by accounting for both pixel disparities (e.g., the separation distance of pixels in a matched pair) and color disparities (e.g., related to color differences in the matched pairs), the method of process block 49 can help to ensure, e.g., that an object's texture and other surface features are accounted for when aligning the visible and NIR images.

The method 37 then moves to a block 42 to align the NIR image with the visible image. In block 42, for example, the sparse matching performed in process block 49 can be propagated to the dense matching performed in process block 45. The propagation processing can be performed using known methods for recovering depth information from a defocused image. For example, one general way to align the images in block 42 is to generate a cost function that relates the sparse matching and the dense matching and to numerically minimize the cost function to propagate the sparse map to the dense map. One example propagation process is disclosed in, e.g., Shaojie Zhuo and Terence Sim, "Recovering Depth from a Single Defocused Image," *Pattern Recognition*, vol. 44, no. 9, pp. 1852-1858 (2011), which is incorporated by reference herein in its entirety and for all purposes. Skilled artisans will understand that there are various ways to propagate a sparse image map to a dense map. Furthermore, the NIR image can be warped to the perspective of the visible image based on the dense matching process of process block 45 to visually confirm whether or not the NIR and visible images are well-aligned.

Advantageously, the implementations disclosed herein can utilize a combination of both the weights calculated in process block 49 and intensity similarity values to generate the cost function and align the images in block 42. For example, to calculate the intensity similarity values, the difference in intensities can be estimated for each pixel in the disparity map such as by, e.g., computing the intensity difference between the pixel and nearby or neighboring pixels in corresponding locations of the captured visible or NIR images. Furthermore, the weights that were assigned in process block 49 can be filtered such that only matches having relatively high weights are used to propagate the sparse matching results. In some implementations, only matches having the top 50% of weights may be used. Both the weights (which can function as a confidence map) and/or the intensity similarity values can be used in the alignment such that a more accurate propagation is obtained. As a result of incorporating the confidence map (e.g., the weights) and/or intensity similarity values, the alignment of the NIR and visible images can be improved.

The method 37 then proceeds to a block 44 to store the aligned image on the system, e.g., by way of the storage module 12. The method 37 then proceeds to a decision block 46 to determine whether additional images are to be aligned. If a decision is made that additional images are to be aligned, then the method 37 returns to block 41 to receive a NIR image. If a decision is made that there are no additional images to align, then the method 37 terminates.

Dense Matching Process

Figure 5:
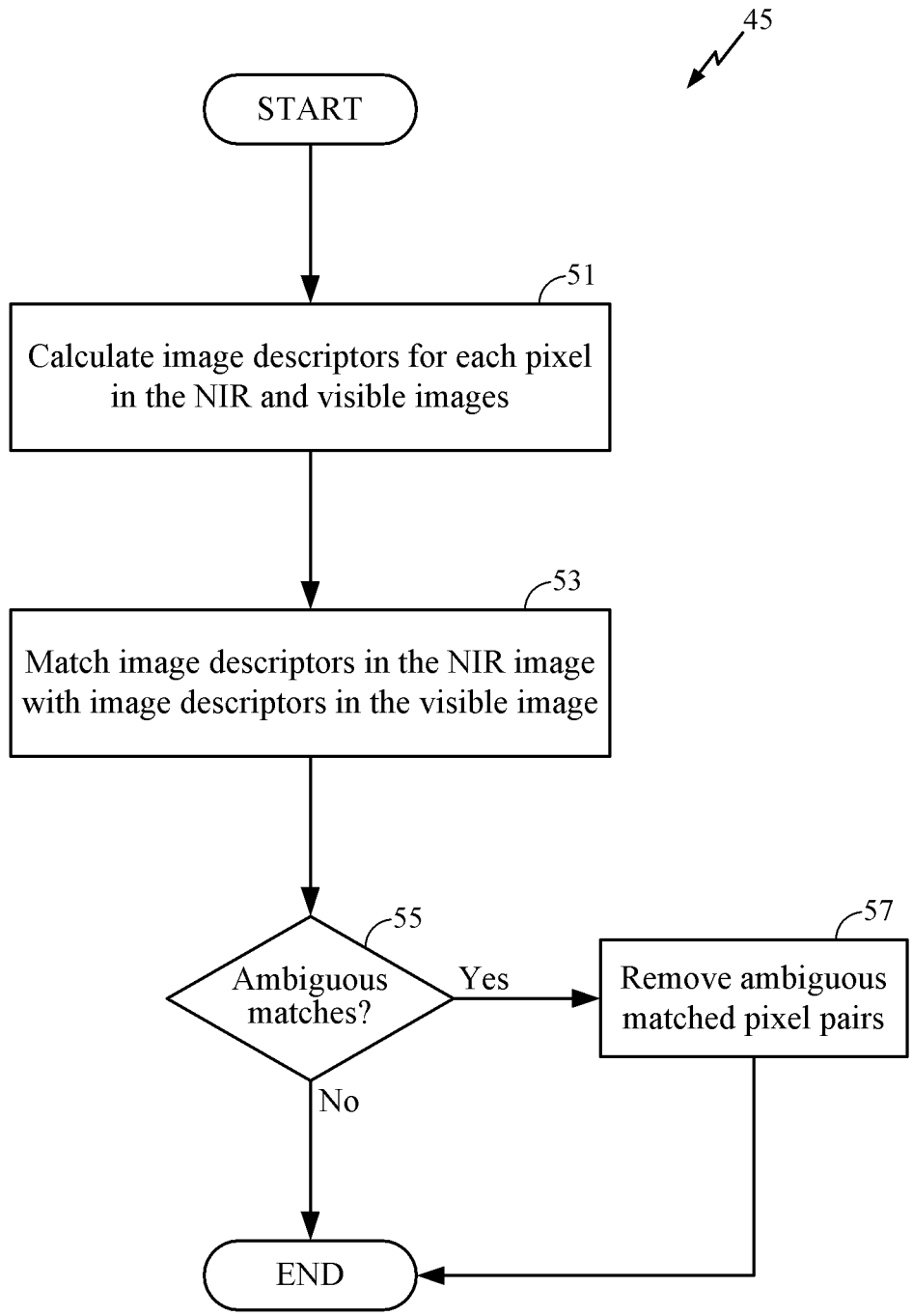
FIG. 5 is a flowchart of a method for matching pixels in the NIR image with pixels in the visible light image, according to the implementation of FIG. 4.

FIG. 5 is a flowchart of a method 45 for matching pixels in the NIR image with pixels in the visible light image, according to the implementation of FIG. 4. The disclosed pixel-by-pixel process may be performed by, e.g., the dense matching module 26. The method 45 begins in a block 51 to calculate image descriptors for each pixel in the NIR and visible images. In general, the image descriptors can be based on local image gradients for a portion of an image or for a pixel. The local image gradients can measure the rate of change of the image data in multiple directions or orientations around a particular pixel or portion of an image. At each pixel (or portion of the image), the local image gradients in regions surrounding the pixel or image portion can be accumulated into an orientation histogram.

The orientation histograms for regions surrounding a particular pixel or image portion can be converted into an n×1 image descriptor vector, $\vec{k}$, where n is based on the number of orientations and the number of surrounding image regions used in estimating the descriptors. For example, if a 4×4 array of surrounding pixels or image regions is used to calculate the descriptor, and if 8 orientations are used, then the descriptor vector, $\vec{k}$, can be a 128×1 vector (e.g., 4×4×8). Skilled artisans will appreciate that other techniques for determining image descriptors based on local image gradients are possible. For example, one technique for forming image descriptors is described in David G. Lowe, "Distinctive Image Features from Scale-Invariant Keypoints," *International Journal of Computer Vision*, pp. 91-100 (2004), which is hereby incorporated by reference herein in its entirety and for all purposes.

Figures 1, 2, 6B:
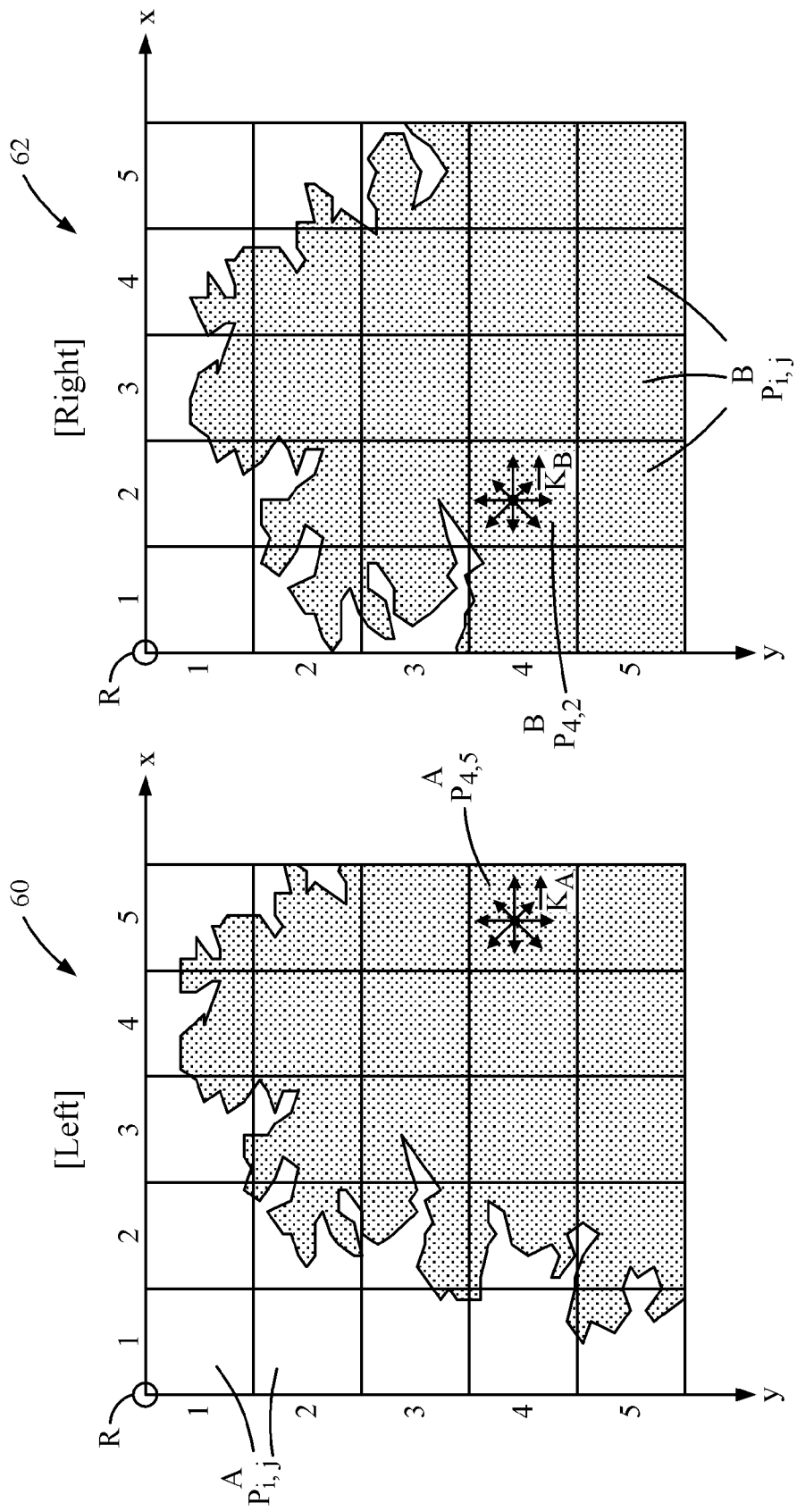

FIGS. 6A-1, 6A-2, 6B-1, and 6B-2 are schematic diagrams showing two images of the tree 2 captured by the multispectral imaging system 10 of FIG. 2. In particular, FIG. 6A-1 shows a left image captured by a left imaging sensor, and FIG. 6A-2 shows a right image captured by a right imaging sensor of the imaging system 10. The left image in FIG. 6A-1 may correspond to an image captured by the NIR imaging sensor 7, and the right image in FIG. 6A-2 may correspond to an image captured by the visible imaging sensor 5, or vice versa. As shown, the captured images of FIGS. 6A-1 and 6A-2 share a common coordinate system R that measures distances in pixels along the x-direction and the y-direction, respectively. It should be appreciated that, in various implementations, the images of FIGS. 6A-1 and 6A-2 can be vertically aligned during a pre-calibration step such that rows of pixels are substantially aligned vertically. FIG. 6A-1 includes selected area 60 and FIG. 6A-2 includes a selected area 62.

The images in FIGS. 6B-1 and 6B-2 are schematic diagrams of magnified portions of the selected areas 60, 62 of the tree 2 from FIGS. 6A-1 and 6A-2, respectively. Thus, the magnified image portions shown in FIGS. 6B-1 and 6B-2 correspond to portions 60 and 62 of the images bounded by the box shown in dashed lines in FIGS. 6A-1 and 6A-2. For example, the box in both images can span from 0 to $x_1$ in the x-direction and from $y_1$ to $y_2$ in the y-direction of the common coordinate system R. As shown in FIGS. 6B-1 and 6B-2, these images can be divided into a plurality of pixels, $p_{i,j}^A$ for the image of FIG. 6B-1 and $p_{i,j}^B$ for the image of FIG. 6B-2. The subscript i may refer to an index for the y-direction, and the subscript j may refer to an index for the x-direction. Note that the size of the pixels in FIGS. 6B-1 and 6B-2 may be exaggerated for purposes of illustration.

In FIGS. 6B-1 and 6B-2, image descriptors may be calculated for every pixel in each images. For example, at pixel $p_{4,5}^A$ of FIG. 6B-1, an image descriptor, $\vec{k}_A$, may be calculated as described herein. Note that an orientation histogram is shown only for pixel $p_{4,5}^A$, but in general, orientation histograms for the local image gradients may also be calculated for all the pixels or image regions in the image. In addition, at pixel $p_{4,2}^B$ of FIG. 6B-2, an image descriptor, $\vec{k}_B$, may be calculated. As with FIG. 6B-1, an orientation histogram for the local image gradient at pixel $p_{4,2}^B$ is shown just as an example.

Referring now to FIG. 5, the method 45 moves to a block 53 to match image descriptors in the NIR image with image descriptors in the visible image. In various implementations, the dense matching module 26 may search for the nearest neighbor of each image descriptor $\vec{k}$ in the other image. For example, consider a source pixel $p_{4,5}^A$ and its associated image descriptor $\vec{k}_A$ in FIG. 6B-1. In block 53, the method 45 searches for a target pixel in FIG. 6B-2 that has an image descriptor $\vec{k}$ that is at a minimum Euclidean distance (or at a minimum associated with another measure of matching costs, as explained above) from the image descriptor $\vec{k}_A$ associated with the particular source pixel $p_{4,5}^A$ of FIG. 6B-1. Because FIGS. 6B-1 and 6B-2 may be vertically aligned during a pre-calibration step, the dense matching module 26 can infer that the nearest neighbor to pixel $p_{4,5}^A$ in FIG. 6B-2 probably lies along the same row of pixels, e.g., Row 4. However, if there is no pre-calibration step, or if the pre-calibration step is inaccurate, then the dense matching module 26 can instead search pixels along the epipolar line in FIG. 6B-2 that passes through the pixel $p_{4,5}^A$ in FIG. 6B-1.

Assuming that FIGS. 6B-1 and 6B-2 are accurately aligned in the vertical direction, the method 45 can select a subset of target pixels in FIG. 6B-2 that may be candidates for matching with a source pixel $p_{4,5}^A$ in FIG. 6B-1. For example, in one example, the method 45 may select pixels $p_{4,1}^B$, $p_{4,2}^B$, $p_{4,3}^B$, $p_{4,4}^B$, and $p_{4,5}^B$ of FIG. 6B-2 as candidate target pixel matches for pixel $p_{4,5}^A$ in FIG. 6B-1, because those pixels are spatially close to the position of pixel $p_{4,5}^A$ in FIG. 6B-1. Of course, the method 45 can instead search a larger set of target pixels in FIG. 6B-2, including all pixels, but such a larger search can disadvantageously increase processing time. Thus, the method 45 can calculate the Euclidean distance, d, by calculating, e.g., $d=|p_{4,5}^A-p_{i,j}^B|$ for each pixel in the set of candidate pixels in FIG. 6B-2. The target pixel p $p_{i,j}^B$ in the set of candidate pixels of FIG. 6B-2 that is associated with the minimum Euclidean distance, $d_{min}$, can be matched with the source pixel $p_{4,5}^A$ of FIG. 6B-1 to form a matched pixel pair. For example, in FIGS. 6B-1 and 6B-2, pixels $p_{4,5}^A$ of FIG. 6B-1 and $p_{4,2}^B$ of FIG. 6B-2 can form a matched pixel pair if the Euclidean distance between their respective image descriptors $\vec{k}_A$ and $\vec{k}_B$ is the minimum Euclidean distance, $d_{min}$, for the set of candidate pixels from FIG. 6B-2.

In the example described above with respect to FIGS. 6A-1, 6A-2, 6B-1 and 6B-2, the source pixel was selected from FIG. 6B-1, and a set of candidate target matches were searched in FIG. 6B-2. In various implementations, the method 45 can perform a left-right consistency check by starting with source pixels from FIG. 6B-2 and searching for nearest neighbors among a set of target pixels in FIG. 6B-1. By performing the nearest neighbor search in both directions, the method 45 can ensure that the matched pixel pairs are accurately assigned.

The method 45 moves to a decision block 55 to determine whether the matched pixel pairs are ambiguous, e.g., whether or not there is a high degree of confidence for each matched pixel pair. In various implementations, the method 45 can establish a distance ratio r that compares the minimum Euclidean distance, $d_{min}$, with the n next-smallest Euclidean distances $d_i$ in the set of candidate target pixels. For example, in some implementations, the distance ratio for the $m^{th}$ matched pixel pair, $r_m$, can be computed by:

$$r_m = \frac{d_{min}}{\text{average}(d_1, d_2, \ldots d_n)}.$$

A high distance ratio, $r_m$, e.g., a ratio near 1, may reflect a match that is not discriminative, because other neighboring descriptors have a similar distance $d_i$ from the source descriptor. Distance ratios with smaller values, e.g., less than about 0.95, may yield a more confident match. Thus, if the distance ratio for the $m^{th}$ matched pair, $r_m$, exceeds a certain threshold, then the method 45 may determine in block 55 that there is an ambiguous match. If it is determined that there is an ambiguous match, then the method 45 moves to a block 57 to remove the ambiguous matched pixel pairs from further processing in order to discard ambiguous results. If, however, the distance ratio for the $m^{th}$ matched pair, $r_m$, is less than a certain threshold, then the method 45 may determine in block 55 that there is not an ambiguous match. If it is determined that there is not an ambiguous match, then the method 45 ends.

Figure 7:
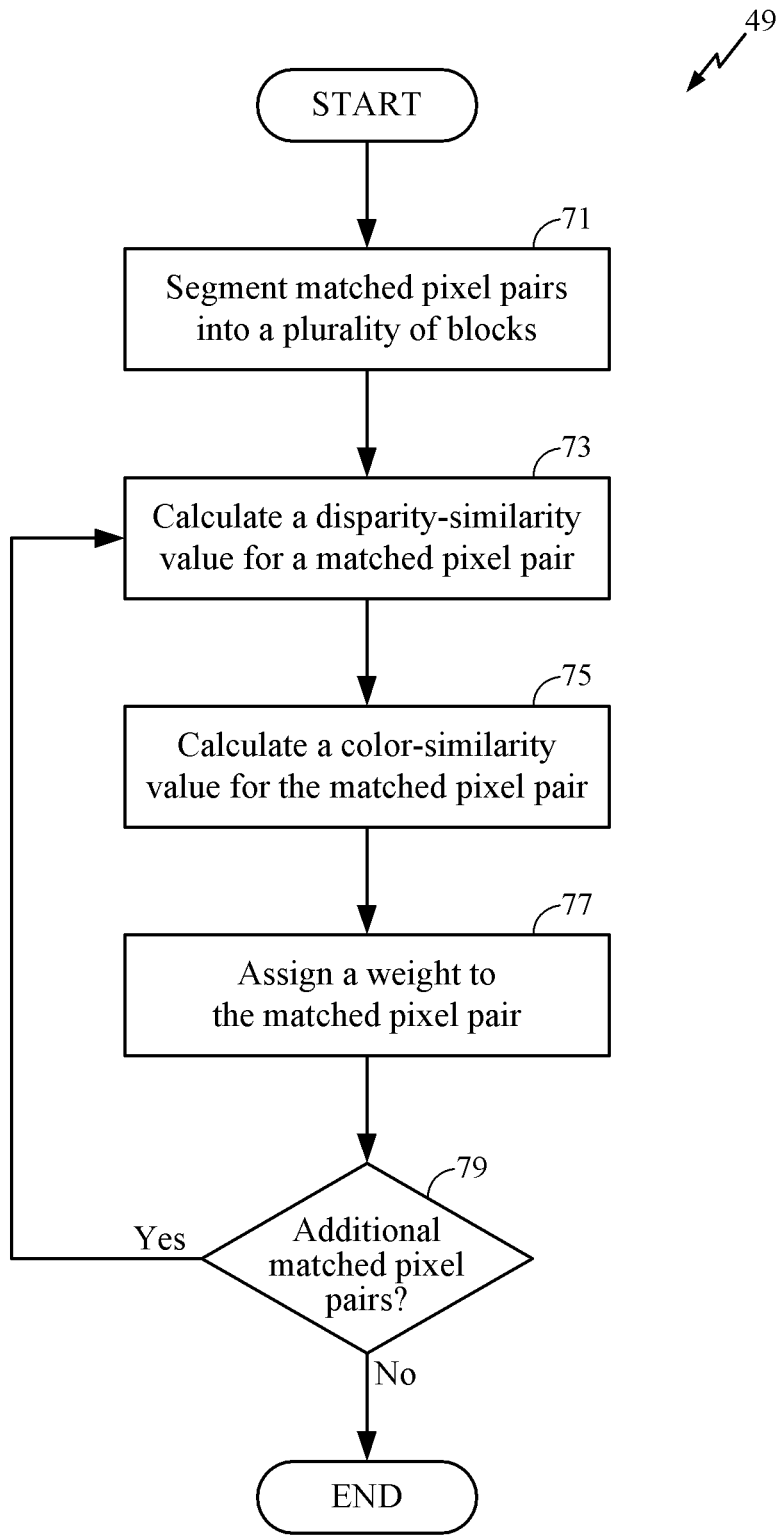
FIG. 7 is a flowchart of a method for assigning weights to each matched pixel pair, according to the implementation of FIG. 4.

FIG. 7 is a flowchart of the method 49 for assigning weights to each matched pixel pair, according to the implementation of FIG. 4. The method 49 begins in a block 71 to segment matched pixel pairs into a plurality of blocks. The blocks can generally divide the image into multiple groups of pixels. For example, the image can be segmented into any suitable number of blocks, such as, e.g., a 4×4, 8×8, or 10×10 array of pixel blocks.

The method 49 proceeds to a block 73 to calculate a disparity-similarity value for a matched pixel pair. As explained above with respect to FIG. 4, a pixel disparity, $q_m$, may refer to a pixel separation distance in the visible and NIR images between the pixels in a matched pixel pair. For example, returning to the example of FIGS. 6B-1 and 6B-2, the matched pair of pixels $p_{4,5}^A$ and $p_{4,2}^B$ are separated by a distance in the common coordinate frame R shown in FIGS. 6B-1 and 6B-2. In particular, the pixel disparity, $q_m$, for the matched pair of pixels $p_{4,5}^A$ and $p_{4,2}^B$ of this example is 3 pixels, because the two pixels are horizontally separated by three pixels and vertically separated by zero pixels.

In the block 73, the method 49 calculates the disparity-similarity value that determines how close the $m^{th}$ matched pair's disparity, $q_m$, is to the most frequent disparity (or the mode disparity), $q_0$, within the block that includes the $m^{th}$ matched pair. Thus, for a particular block, an image disparity, q, of 5 is the most frequent disparity in that block, then the mode disparity, $q_0$, is 5 pixels. In various implementations, the disparity-similarity value, $s_d(m)$, can be defined by:

$$s_d(m) = e^{\left(\frac{|q_m-q_0|}{\sigma_d}\right)},$$

where $\sigma_d$ is a variance factor, which can be 1 in various implementations. Thus, the disparity-similarity value, $s_d(m)$, can compare how close a particular match's disparity is to the most frequent disparity within a block.

The method 49 then moves to a block 75 to calculate a color-similarity value, $s_c(m)$, for the matched pixel pair. The color-similarity value can thereby be used to determine how close a matched pixel pair's color value, $c_m$, is to an average color value of matched pixel pairs having a pixel disparity $q_m$ that is near or close to the mode pixel disparity $q_0$ in the block including that matched pixel pair. For example, the average color value, $c_0$, can be computed for l pixels that have a disparity $q_l$ that is within a predetermined number of pixels, t, from the mode disparity $q_0$ (e.g., t=2 pixels in some arrangements). Thus, the average color, $c_0$, can be computed as:

$c_0 = \text{average}(c_1, c_2, \ldots, c_l)|, q_l = q_0 \pm t$

Given the average color value, $c_0$, the color-similarity value, $s_c(m)$, can be computed by:

$$s_c(m) = e^{\left(\frac{|c_m-c_0|}{\sigma_c}\right)},$$

where $\sigma_c$ is a variance factor, which can be 1 in various implementations.

The method 49 then proceeds to a block 77 to assign a weight, w(m), to the matched pixel pair. In various arrangements, the assigned weight, w(m), can be based in part on the disparity-similarity value, $s_d(m)$, and the color-similarity value, $s_c(m)$. In some implementations, the weight, w(m), for each matched pair can further be based on the distance ratio, $r_m$, which was calculated above in block 55 of FIG. 5. For example, in various implementations, the assigned weight, w(m), for the $m^{th}$ match can be assigned based on the calculation:

$w(m)=(1-r_m)s_d(m)s_c(m)$

Thus, matches having low distance ratios, $r_m$, may generally have higher weights than those with higher distance ratios. In addition, as the disparity-similarity value and the color-similar value increase, the assigned weight may also increase. In various implementations, only weights, w(m), that exceed a certain threshold, or that are the highest weights, may be included when aligning the NIR and visible images. For example, the top 50% of weights may be selected or kept within a particular block. By keeping only higher weights, w(m), the method 49 can keep only those matches that have similar disparities and/or colors or intensities. As explained above with respect to FIG. 4, the matched pairs associated with the higher weights may be used to estimate a homographic constraint between the NIR and visible images, and all matched pairs that satisfy that homography may be kept in the alignment step 42 of FIG. 4.

The method 49 then proceeds to a decision block 79 to determine whether there are additional matched pixel pairs. If a decision is made that there are additional matched pixel pairs, then the method 49 returns to block 73 to calculate a disparity-similarity value for the matched pixel pair. If, however, a decision is made that there are no additional matched pixel pairs, then the method 49 terminates.

As explained above with respect the FIG. 4, the NIR and visible images can be aligned in the block 42, and the aligned images can be stored.

Multispectral Imaging Applications

Figure 8:
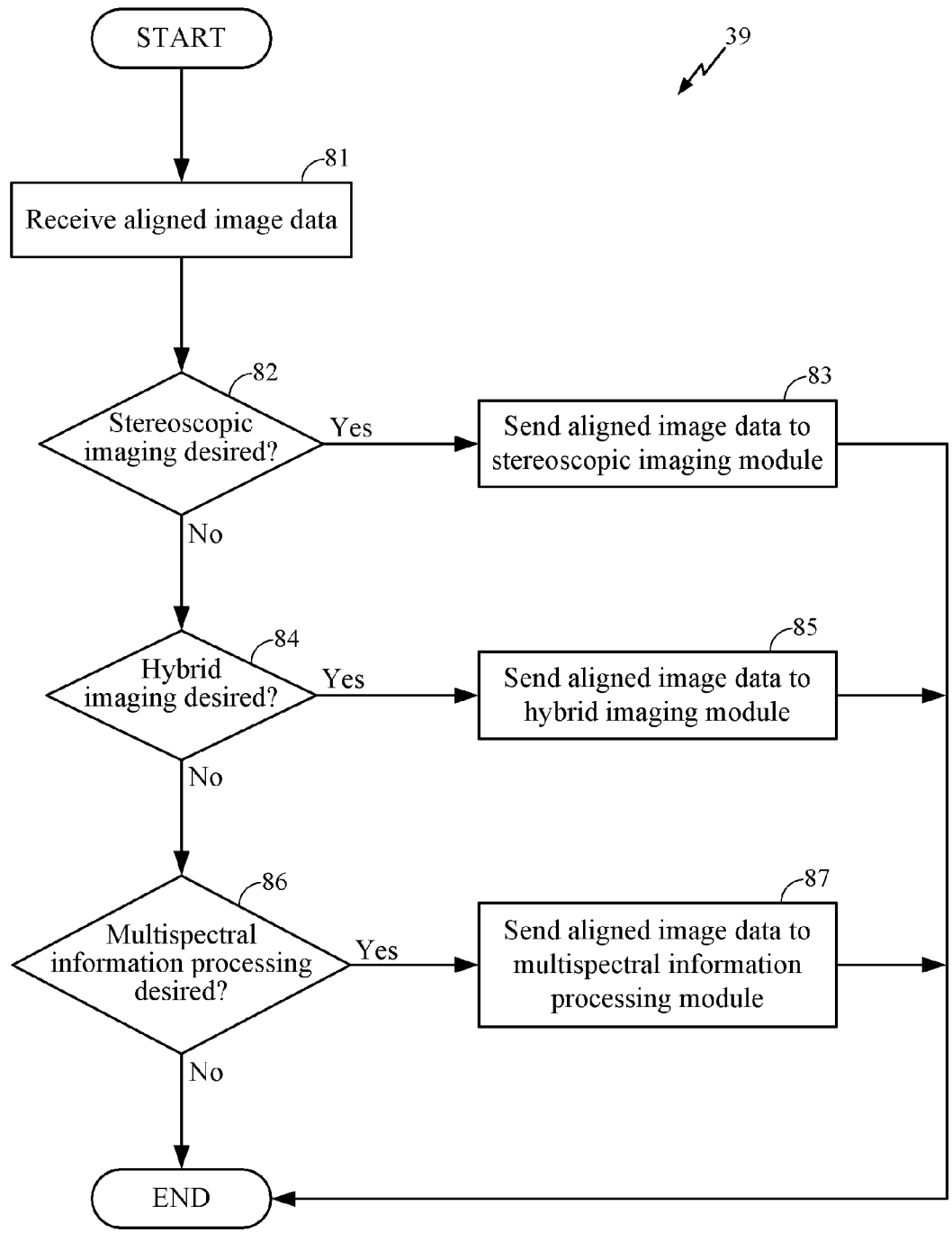
FIG. 8 is a flowchart of a method for processing image data, according to the implementation of FIG. 3.

FIG. 8 is a flowchart of a method 39 for processing image data, according to the implementation of FIG. 3. Once the NIR and visible images are aligned, various multispectral imaging processes may be performed on the aligned images. For example, the method 39 begins in a block 81 to receive aligned image data, which can include aligned NIR and visible images that were aligned in step 37 of FIG. 3.

The method 39 then moves to a decision block 82 to determine whether the user desires stereoscopic imaging applications. If a decision is made that stereoscopic imaging is desired, then the method 39 moves to a block 83 to send the aligned image data to the stereoscopic imaging module 23 of FIG. 2 to render a 3D image for the user. Stereoscopic imaging applications can advantageously present a 3D image to the user. Stereoscopic applications can be used for 3D video production and/or range-finding applications. For example, a depth map can be computed based on imaging disparities, as described herein. To match the resolution of the video output, the depth map can be interpolated to achieve a finer resolution using existing super-resolution methods. Skilled artisans will understand that various stereoscopic imaging procedures may be used.

If a decision is made in block 82 that stereoscopic imaging and/or rendering is not desired, then the method 39 proceeds to a decision block 84 to determine whether or not hybrid imaging is desired. If hybrid imaging is desired, then the method 39 moves to block 85 to send aligned image data to the hybrid imaging module 25. As explained herein, hybrid imaging processes can be used to exploit high-resolution still image data and low-resolution video data. Hybrid imaging may be used in various applications, including, e.g., image de-noising, de-blurring, super-resolution, etc. The disclosed mulitspectral imaging system 10, as noted above, may be configured such that the visible light sensor 5 can take high resolution, still photographs while the NIR sensor 7 takes a lower resolution video of the scene. Of course, the NIR sensor 7 may instead take the still photographs while the visible light sensor 5 takes the video.

In such hybrid systems, a variety of methods may be employed to reduce motion blur caused by relative motion of the camera and the scene during the time it takes to capture the image. One such method, which deals with two visible sensors, is disclosed in M. Ben-Ezra and S. K. Nayar, "Motion-based Motion Deblurring", IEEE Transactions on Pattern Analysis and Machine Intelligence, 2004, which is incorporated by reference herein in its entirety and for all purposes. In this method, a high resolution visible (e.g., RGB) sensor captures an image, and a low resolution visible (e.g., RGB) motion sensor (such as video camera) capture images of a particular scene. The low resolution video camera is used to calculate the continuous point spread function that represents the motion of the scene relative to the camera. A deconvolution approach is used to deblur the high resolution image. Of course, as a skilled artisan would recognize, these methods are only a few ways of reducing motion blur in an image. Other suitable methods may be used with the disclosed imaging system.

If a decision is made in block 84 that hybrid imaging is not desired, then the method 39 moves to a decision block 86 to determine whether multispectral information processing is desired. As explained herein, multispectral imaging systems, such as the disclosed NIR-visible multispectral imaging system 10, can take advantage of the rich details that are included in a broad bandwidth of light. If a decision is made in block 86 that multispectral information processing is desired, then the method 39 moves to a block 87 to send the aligned image data to the multispectral information processing module 27 for use with various multispectral processing techniques, explained below.

In general, NIR light may yield better contrast than visible light and carries rich details, which generates great potential for image quality enhancement, such as contrast enhancement and image de-hazing. For example, in some implementations, image contrast may be enhanced using the disclosed system 10, according to the methods disclosed in X. P. Zhang, T. Sim, X. P. Miao, "Enhancing Photographs with Near Infrared Images", IEEE Computer Society Conference on Computer Vision and Pattern Recognition 2008, Anchorage, US, which is incorporated by reference herein in its entirety and for all purposes. In this particular method, the NIR and visible images may be decomposed into average and detail wavelet subbands. The brightness and texture details may be transferred from the NIR image to the visible image using a histogram-matching technique.

Further methods of contrast and texture enhancement are disclosed in U.S. Patent Publication US 2010/0290703, entitled "Enhancing Photograph Visual Quality Using Texture and Contrast Data from Near Infra-red Image" and filed May 13, 2010 (published Nov. 18, 2010), which is incorporated by reference herein in its entirety and for all purposes. In the methods disclosed in the '703 Publication, a weight region mask from the visible (e.g., RGB) image is calculated. Contrast and texture data from the NIR image is transferred to the visible image using the weighted region mask, and a wavelet transform is performed. A histogram-matching technique is used to calculate the contrast data using the low frequency subbands of the visible and NIR images. The high frequency subbands of both the visible and NIR images are used to compute the texture data. Of course, as a skilled artisan would recognize, these contrast and texture enhancement methods are only a few ways of enhancing contrast in multispectral imaging systems. Other suitable methods may be used with the disclosed imaging system.

In low light conditions, the multispectral imaging system 10 disclosed herein may be used to reduce noise in visible (e.g., RGB) images resulting from the low lighting levels. In conventional low light systems, a visible flash system is often used to illuminate the object to be imaged. However, such artificial light may ruin the ambience of the image and may introduce unwanted artifacts like red eye, undesired reflections, and shadows. One method for reducing noise in low lighting conditions while minimizing the problems associated with a visible light flash is disclosed in Shaojie Zhuo, Xiaopeng Zhang, Xiaoping Miao and Terence Sim, "Enhancing Low Light Images Using Near Infrared Flash Images", International Conference on Image Processing 2010, Hong Kong, which is incorporated by reference herein in its entirety and for all purposes. In this method, a NIR flash lamp is used instead of a visible flash, and a conventional visible imaging sensor (such as a RGB color CCD) captures the image. The NIR flash image is not contaminated with noise as in the visible flash, and the NIR flash image may be used in conjunction with a denoising technique (such as a weighted least squares smoothing technique) to remove noise from the visible (e.g., RGB) image caused by low lighting conditions. Of course, as a skilled artisan would recognize, this noise reduction method is only one way of reducing noise in imaging systems. Other suitable methods may be used with the disclosed imaging system.

In other cases, the multispectral imaging system 10 may be used to de-haze images. For example, distant objects in landscape photographs may appear hazy due to Rayleigh scattering in the atmosphere. One approach to de-hazing an image is disclosed in L. Schaul, C. Fredembach, and S. Süsstrunk, "Color Image Dehazing using the Near-Infrared", International Conference on Image Processing 2009, Cairo, Egypt, which is incorporated by reference herein in its entirety and for all purposes. In this method, visible and NIR images of a particular scene are fused. A multiresolution approach using edge-preserving filtering is employed to reduce the haze. Of course, as a skilled artisan would recognize, this method is only one way of de-hazing an image. Other suitable methods may be used with the disclosed imaging system.

In yet other embodiments, the disclosed hybrid imaging system may be used in skin smoothing applications. In portrait photography, certain undesirable skin features, such as wrinkles, freckles, and spots, may be captured in an image. The disclosed multispectral imaging system 10 may be used to remove or smooth these undesirable features in many different ways. Several such methods are disclosed in C. Fredembach, N. Barbuscia, and S. Süsstrunk, "Combining visible and near-infrared images for realistic skin smoothing", IS&T/SID 17th Color Imaging Conference, which is incorporated by reference herein in its entirety and for all purposes. Fredembach et al. disclose three methods of enhancing skin features using NIR. In a first method, the luminance of an RGB image could simply be replaced by the NIR data. In Fredembach's second method, NIR and RGB images may be fused using wavelet decomposition. Finally, in the third method, a bilateral, edge-aware spatial filter may be used to decompose an image into base and detail layers, fuse the NIR image's detail layer with the base layer of the visible luminance, add chrominance information, and finally transform the resulting image back into an RGB visible image. Of course, as a skilled artisan would recognize, these methods are only a few ways of smoothing skin in an image. It should be realized that other suitable methods may be used with the disclosed imaging system without departing from the spirit of the invention.

Returning to the method 39 of FIG. 8, if a decision is made in block 86 that multispectral information processing is not desired, then the method 39 ends. Thus, the method 39 of FIG. 8 outlines various multispectral image processing techniques and applications that can be employed with the disclosed system 10.

Example Implementation of Alignment Process

Figure 9A:
FIGS. 9A-9C are example images at various stages of an image alignment process, according to one implementation.
Figure 9B:
Figure 9C:
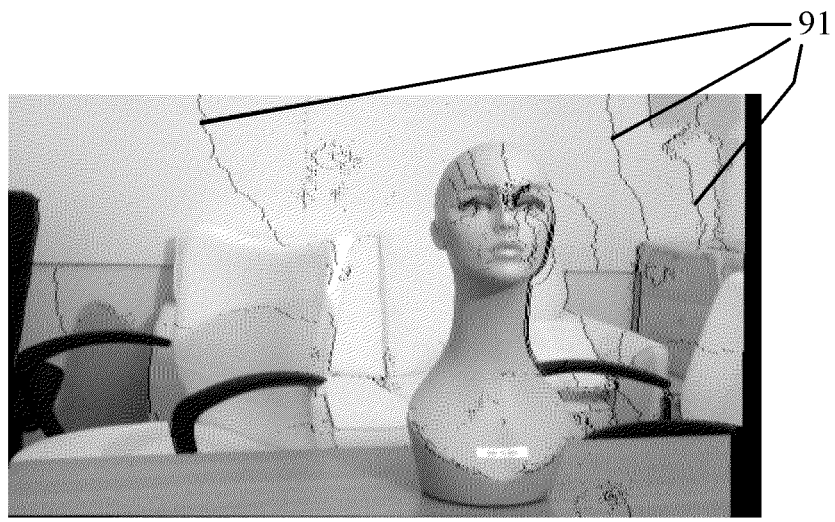

FIGS. 9A-9C are example images at various stages of an image alignment process, according to one implementation. The experiments for FIGS. 9A-9C were captured using a pair of Samsung S5K4E1GX QSXGA CMOS sensors. For the NIR sensor, a Kodak Wratten IR filter (#87C) was applied over the sensor. FIG. 9A shows the pair of captured images of a scene including a mannequin on a table, and a chair and a sofa in the background. An input NIR image is shown on the left, and an input visible (e.g., RGB) image is shown on the right. FIG. 9B shows the results after the dense matching process disclosed in step 45 of FIG. 4, and FIG. 9C shows the results after the images are aligned in step 44 of FIG. 4. As shown in FIG. 9C, the NIR image has been warped to the perspective of the visible image based on the dense matching result. Various image artifacts 91 can be seen in the warped image of FIG. 9C. The artifacts 91 may represent slight misalignment due to imperfections in the alignment process. In addition, the artifacts 91 may occur due to various occlusions, e.g., when one imaging sensor cannot see a portion of the scene that the other imaging sensor can view. However, as shown in FIG. 9C, the results of the disclosed systems and methods show that NIR and visible images can be accurately aligned.

Clarifications Regarding Terminology

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An electronic method for aligning a near infrared (NIR) image with a visible image in a system including a NIR imaging sensor and a visible imaging sensor, the method comprising:
   receiving a NIR image from the NIR imaging sensor, the NIR image being devoid of visible image data;
   receiving a visible image from the visible imaging sensor;
   matching pixels in the NIR image with pixels in the visible image on a pixel-by-pixel basis to form a plurality of matched pixel pairs based at least in part on an association of NIR pixel image data with visible pixel image data for each matched pixel pair;
   calculating a pixel disparity, a disparity-similarity, and a color-similarity for each matched pixel pair;
   assigning weights to each matched pixel pair based at least in part on the calculated pixel disparity, the calculated disparity-similarity, and the calculated color-similarity for each matched pixel pair; and
   aligning the NIR image with the visible image based at least in part on the assigned weights that exceed a predetermined threshold.

2. The electronic method of claim 1, wherein matching pixels in the NIR image comprises calculating image descriptors for each pixel in the NIR image and the visible image based at least in part on image gradients in the NIR image and the visible image.

3. The electronic method of claim 1, wherein calculating the pixel disparities for each matched pixel pair includes calculating a pixel separation distance in the visible and NIR images between the pixels in that matched pixel pair.

4. The electronic method of claim 1, wherein assigning weights to each pair of matched pixels comprises segmenting the matched pixel pairs into a plurality of blocks.

5. The electronic method of claim 1, wherein aligning the NIR image with the visible image is based at least in part on a difference of intensities between the NIR image and the visible image.

6. The electronic method of claim 5, further comprising warping one of the NIR image and the visible image to a perspective of the other of the NIR image and the visible image based at least in part on the plurality of matched pixel pairs.

7. The electronic method of claim 1, wherein aligning the NIR image with the visible image is based at least in part on the assigned weights that satisfy a homographic constraint of the NIR and visible images.

8. A multispectral imaging system comprising:
   a near infrared (NIR) imaging sensor configured to capture a NIR image, the NIR image being devoid of visible image data;
   a visible light imaging sensor configured to capture a visible light image;
   a dense matching module programmed to match pixels in the NIR image with pixels in the visible light image on a pixel-by-pixel basis to form a plurality of matched pixel pairs based at least in part on an association of NIR pixel image data with visible pixel image data for each matched pixel pair;
   a sparse matching module programmed to:
      calculate a pixel disparity, a disparity-similarity, and a color-similarity for each matched pixel pair; and
      assign weights to each matched pixel pair based at least in part on the calculated pixel disparity, the calculated disparity-similarity, and the calculated color-similarity for each matched pixel pair;
   an aligned image formation module programmed to align the NIR image with the visible image based at least in part on the assigned weights that exceed a predetermined threshold; and
   a storage module programmed to store the aligned image on the system.

9. The multispectral imaging system of claim 8, wherein the dense matching module is further programmed to calculate image descriptors for each pixel in the NIR image and the visible image based at least in part on image gradients in the NIR image and the visible image.

10. The multispectral imaging system of claim 9, wherein the dense matching module is configured to match image descriptors in the NIR image with image descriptors in the visible image to form the plurality of matched pixel pairs.

11. The multispectral imaging system of claim 8, wherein the sparse matching module is programmed to segment the matched pixel pairs into a plurality of blocks.

12. The multispectral imaging system of claim 8, wherein the aligned image formation module is programmed to align the NIR image with the visible image based at least in part on a difference of intensities between the NIR image and the visible image.

13. The multispectral imaging system of claim 8, wherein the aligned image formation module is programmed to align the NIR image with the visible image based at least in part on the assigned weights that satisfy a homographic constraint of the NIR and visible images.

14. The multispectral imaging system of claim 8, further comprising a stereoscopic imaging module programmed to render a three-dimensional image based at least in part on a depth map computed from the NIR image and the visible image.

15. The multispectral imaging system of claim 8, further comprising a hybrid imaging module programmed to process still image data from the visible imaging sensor at a first resolution and video image data from the NIR imaging sensor at a second resolution, the second resolution less than the first resolution.

16. The multispectral imaging system of claim 8, wherein the multispectral imaging system is a cellular telephone.

17. The multispectral imaging system of claim 8, further comprising a multispectral information processing module programmed to process NIR image data captured from the NIR imaging sensor to enhance contrast in visible image data captured from the visible imaging sensor.

18. An imaging system, comprising:
- means for receiving a near infrared (NIR) image from a NIR imaging sensor, the NIR image being devoid of visible image data;
- means for receiving a visible image from a visible imaging sensor;
- means for matching pixels in the NIR image with pixels in the visible image on a pixel-by-pixel basis to form a plurality of matched pixel pairs based at least in part on an association of NIR pixel image data with visible pixel image data for each matched pixel pair;
- means for calculating a pixel disparity, a disparity-similarity, and a color-similarity for each matched pixel pair;
- means for assigning weights to each matched pixel pair based at least in part on the calculated pixel disparity, the calculated disparity-similarity, and the calculated color-similarity for each matched pixel pair; and
- means for aligning the NIR image with the visible image based at least in part on the assigned weights that exceed a predetermined threshold.

19. The imaging system of claim 18, wherein the means for receiving the NIR image and the means for receiving the visible image include a communications module.

20. The imaging system of claim 18, wherein the pixel matching means includes a dense matching module.

21. The imaging system of claim 18, wherein the pixel disparities calculating means includes a sparse matching module.

22. The imaging system of claim 21, wherein the sparse matching module further includes the weight assigning means.

23. The imaging system of claim 18, wherein the aligning means includes an aligned image formation module.

24. A non-transitory computer-readable medium having stored thereon code that when executed performs a method comprising:
- receiving a near infrared (NIR) image from the NIR imaging sensor, the NIR image being devoid of visible image data;
- receiving a visible image from the visible imaging sensor;
- matching pixels in the NIR image with pixels in the visible image on a pixel-by-pixel basis to form a plurality of matched pixel pairs based at least in part on an association of NIR pixel image data with visible pixel image data for each matched pixel pair;
- calculating a pixel disparity, a disparity-similarity, and a color-similarity for each matched pixel pair;
- assigning weights to each matched pixel pair based at least in part on the calculated pixel disparity, the calculated disparity-similarity, and the calculated color-similarity for each matched pixel pair; and
- aligning the NIR image with the visible image based at least in part on the assigned weights that exceed a predetermined threshold.

* * * * *